United States Patent [19]

Burghardt et al.

[11] Patent Number: 4,751,871

[45] Date of Patent: Jun. 21, 1988

[54] MULTISECTIONAL PISTON WITH PLURAL CERAMIC PARTS AND RIGIDLY CONNECTED PISTON ROD FOR USE IN HORIZONTALLY OPPOSED PISTON INTERNAL COMBUSTION ENGINE

[75] Inventors: Helmut W. Burghardt, Schönwald; Manfred Schindler, Markt Schwaben, both of Fed. Rep. of Germany

[73] Assignees: Ficht GmbH, Kirchseeon; Hoechst CeramTec Aktiengesellschaft, Selb, both of Fed. Rep. of Germany

[21] Appl. No.: 841,307

[22] Filed: Mar. 19, 1986

[30] Foreign Application Priority Data

Apr. 4, 1985 [DE] Fed. Rep. of Germany ... 8510204[U]

[51] Int. Cl.[4] .............................. F16J 1/01; F16J 1/12; F16J 9/24; F16J 9/28

[52] U.S. Cl. .............................. 92/212; 92/216; 92/221; 92/224; 92/257

[58] Field of Search .............................. 92/211–213, 92/217–218, 220–221, 224–225, 228–229, 255, 257–258; 277/216, 218–219

[56] References Cited

U.S. PATENT DOCUMENTS

| | | | |
|---|---|---|---|
| 1,668,672 | 5/1928 | Darrah | 92/218 X |
| 1,956,355 | 4/1934 | Junkers | 92/211 X |
| 1,963,725 | 6/1934 | Teetor | 277/218 X |
| 2,105,950 | 1/1938 | Metzgar | 92/258 |
| 2,471,477 | 5/1949 | Bonnaud | 92/251 X |
| 2,657,961 | 11/1953 | Von Lassberg | 92/212 X |
| 3,136,306 | 6/1964 | Kamm | 92/212 X |
| 4,242,948 | 1/1981 | Stang et al. | 92/221 X |
| 4,522,415 | 6/1985 | Dworak et al. | 277/216 |

FOREIGN PATENT DOCUMENTS

| | | | |
|---|---|---|---|
| 463748 | 10/1927 | Fed. Rep. of Germany | 92/220 |
| 920758 | 11/1954 | Fed. Rep. of Germany . | |
| 2212922 | 9/1973 | Fed. Rep. of Germany | 92/224 |
| 3218320 | 4/1982 | Fed. Rep. of Germany . | |
| 1439328 | 6/1976 | United Kingdom . | |

OTHER PUBLICATIONS

"Construction, Building, and Testing of a New Two-Stroke Two-Cylinder Motor Having Ceramic Components According to the Ficht Principle", *German Budeminister Fuer Forschung und Technologie*, Mar. 21, 1985, pp. 178–187.

*Primary Examiner*—Robert E. Garrett
*Assistant Examiner*—George Kapsalas
*Attorney, Agent, or Firm*—Foley & Lardner, Schwartz, Jeffery, Schwaab, Mack, Blumenthal & Evans

[57] ABSTRACT

A multisectional piston for opposed-piston, slider-crank-drive internal combustion engines. The piston has a ceramic skirt (1), a skirt head (2), and a ceramic piston head (3) with fire land (4). The ceramic piston head is provided with annular groove (6) for receiving a slotted, ceramic piston ring (7) and is seated on the skirt head (2). A ceramic, common centering sleeve (5) fixes the skirt and head. Metal or metal alloy centering piece (8) fixed on the piston rod (12) in snug fit (14) has a base plate (9) on which the skirt head seats. An end cover (10) seats on the piston head and has a centering hub (11) axially spaced by a gap (23) from the centering piece. In assembly, the skirt head and piston head are axially clamped between the end cover and the base plate by a screw connection (13).

9 Claims, 1 Drawing Sheet

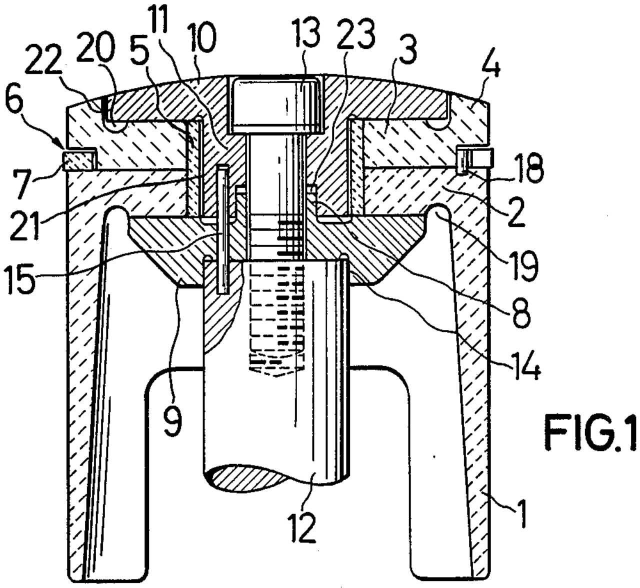
FIG.1
FIG.2
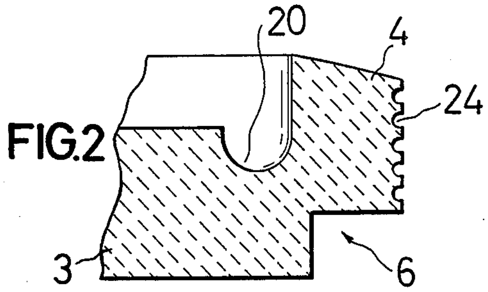
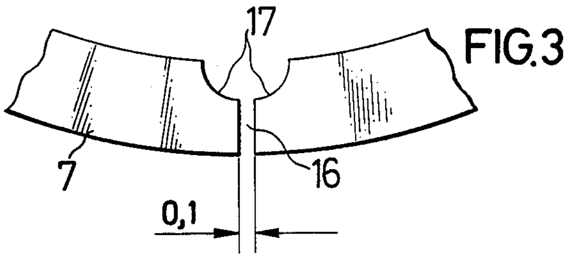
FIG.3

MULTISECTIONAL PISTON WITH PLURAL CERAMIC PARTS AND RIGIDLY CONNECTED PISTON ROD FOR USE IN HORIZONTALLY OPPOSED PISTON INTERNAL COMBUSTION ENGINE

BACKGROUND OF THE INVENTION

1. Field of the Invention

The invention relates to a multisectional lifting piston for internal-combustion engines, in particular those in which the translatory movement of two opposing, synchronous pistons is converted into rotation by a slide crank drive, with a piston rod rigidly connected to the two pistons, as is described and illustrated for example in German Pat. specification No. 920,758.

2. Description of the Invention

Many configurations of internal-combustion engine lifting pistons made of several individual parts are known in what is called high-power engine construction. There, multisectional working pistons have been used for some time. The reasons lie in the different loads to which the engine piston is subjected. For instance, the piston head with its fire land is subjected to alternating thermal stresses and static pressures. In addition, the piston as a whole comes under high dynamic acceleration and deceleration forces. In the case of engines with slider-crank mechanisms, in particular in the case of short stroke engines, great bending forces bear on the piston skirt on account of the high normal pressures.

Since ceramic has recently also been accepted as a material in engine construction and with such so-called ceramic engines all parts in sliding contact with one another have to be made of the same material, in other words the necessary piston ring also has to be produced from ceramic, there arises the problem of fitting such piston rings. As experience shows, the elasticity of such piston rings is not sufficient for them to be stripped over the piston skirt to bring them into the piston's annular groove.

SUMMARY OF THE INVENTION

The object of the invention is therefore to be seen in aligning the multisectionality of a lifting piston such that the fitting or arrangement of a piston ring made of ceramic material in its annular groove provided for this in the fire land of the piston head, in other words of a piston ring which, as far as the material is concerned, cannot be enlarged without breaking, is readily possible. Furthermore, the contemplated multisectionality is to allow for the requirements made on such a piston with respect to thermal and dynamic loadability and is to improve its running properties and service life.

This object is achieved according to the invention by the features specified in patent claim 1.

Further development of the invention is performed by the features set out in the subclaims.

The design according to the invention of the lifting piston readily permits an assembly of the piston ring in the annular groove provided for this in the fire land of the piston head before the fitting of its main parts. The piston skirt made of ceramic material and the piston head produced from ceramic material, with the fire land, produce good slidability and high service life. The centering piece made of metallic material, with the baseplate and the upper end cover with the centering hub of the same material not only center the lifting piston on the end of the piston rod but also ensure a secure clamping together of the main piston parts as the elasticity of the metallic material can cope with the occurrence of alternating continuous loads. In addition, the great quantity of heat generated at the piston head during the combustion process is quickly led away by heat flow to the piston rod, so that heat accumulation in the piston is avoided.

The piston configuration according to the invention and the described piston arrangement can also be used in the case of reciprocating engines in which the normal pressures of the slider-crank drive are absorbed by a cross-head carriage, whereby the piston skirt is relieved. Such reciprocating engines have been proposed, for example, as so-called bio-gas engines.

BRIEF DESCRIPTION OF THE DRAWINGS

An exemplary embodiment according to the invention is illustrated in the drawing, in which FIG. 1 shows a lifting piston, in longitudinal section, with part of the piston rod FIG. 2 shows part of the piston head (3), in radial section, with a fire land (4) and also turning grooves (24) and FIG. 3 shows part of the piston ring, in plan view, with a piston ring slot.

DESCRIPTION OF THE PREFERRED EMBODIMENTS

As can be seen from FIG. 1, the lifting piston consists essentially of a piston skirt 1 with a piston skirt head 2, a piston head 3 with a fire land 4, a centering sleeve 5 for the radial fixing of the two abovementioned main piston parts 1, 2 and 3, 4, a piston ring 7 seated in an annular groove 6 of the fire land 4, a centering piece 8 with a base plate 9 and an end cover 10 with a centering hub 11.

Reference numeral 12 designates a piston rod, at both ends of which there is seated in each case a lifting piston (the second lifting piston is not illustrated), which are both rigidly connected to the piston rod 12. This happens, for example, by means of a cap screw 13 in each case, which is screwed into the piston rod 12. The radial fixing of the lifting piston relative to the piston rod 12 is performed by a snug fit 14 of the base plate 9 on the piston rod 12. The base plate 9 for its part fixes, with the aid of its centering piece 8, the centering hub 11 of the end cover 10. The two parts 8, 9 and 10, 11 are secured against twisting by an alignment pin 15, which extends its inner end into the piston rod 12. The alignment pin 15 at the same time forms a safeguard for the cap screw 13.

The piston skirt 1 with the piston skirt head 2, the piston head 3 with the fire land 4, the inherently resilient piston ring 7, which has an expansion slot 16, and the centering sleeve 5 are all produced from a ceramic material which is capable of bearing high thermal loads and has good sliding properties. At the expansion slot 16, the piston ring 7 is provided with an arcuate rounded-off piece 17 for the arrangement of a twisting pin 18, which prevents a shifting of the piston ring 7.

At the transition between the piston skirt 1 and its head 2, a fillet 19 is provided on its inside wall. A fillet 20 is also recessed into the piston head 3 at the transition to the fire land 4, to avoid notch stresses.

Both between the centering hub 11 and the centering sleeve 5 and between the outside circumference of the end cover 10 and the fire land 4 there has in each case been made a radial expansion gap 21 and 22 respectively.

When the cap screw 13 is tightened, the piston skirt head 2 and the piston head 3 are pressed against each other with pretension between the base plate 9 and the end cover 10. To make this possible, an axial distance gap 23 is provided between the centering piece 8 and the centering hub 11.

To reinforce the seal relative to the cylinder wall, the fire land 4 may be provided radially on the outside with a labyrinth seal in the form of turning grooves 24 (FIG. 2).

Piston skirt, piston ring and piston head are produced from ceramic. Examples which may be used are zirconium oxide, silicon nitride and silicon carbide (in particular silicon-infiltrated silicon carbide=Si—SiC). Moldings of silicon nitride and silicon carbide can be produced with the aid of the isostatic pressing process. The piston head may also be fabricated from aluminum titanate.

Other materials which are outstandingly suitable for the piston ring are silicon-infiltrated graphite (silicon carbide/graphite composite material) or steel which has been coated with ceramic (e.g. zirconium oxide or silicon carbide). It is preferred if piston skirt (1) and piston head (3) are fabricated from the same material or that piston skirt (1), piston head (3), piston ring (7) and centering sleeve (5) are fabricated from the same material.

We claim:

1. A multi-sectional lifting piston for an internal combustion engine comprising
- a piston skirt made of ceramic material and having a piston skirt head;
- a piston head made of ceramic material and having a fire land having an annular groove therearound;
- a slotted piston ring made of ceramic material received in said annular groove of said piston head;
- a centering sleeve made of ceramic material for radially centering said piston skirt and said piston head;
- a piston rod;
- a metal plate snugly fit on an end of said piston rod and supporting said piston skirt head, said base plate having a centering piece mounted thereon;
- a metal end cover seated on the piston head and extending radially up to said fire land, said end cover having a centering hub with a central axial recess into which said centering piece of said metal base plate extends; and
- a threaded connector engaging a mating thread on said piston rod and axially clamping said piston skirt head and said piston head together between said end cover and said metal base plate.

2. A lifting piston as claimed in claim 1, wherein said internal combustion engine is an engine in which the translatory movement of two opposing, synchronous pistons is converted into rotational movement by a slider crank drive, with a piston rod rigidly connected to said two pistons.

3. A lifting piston as claimed in claim 1, wherein said metal base plate is formed of a metal alloy.

4. A lifting piston as claimed in claim 1, wherein said piston ring is formed with a radial joint and has an arcuate recess at the radially inward end of said joint for receiving a fixing pin.

5. A lifting piston as claimed in claim 1, wherein both between the centering hub of the end cover and the centering sleeve and between the outside circumference of the end cover and the inside circumference of the fire land of the piston head in each case a respective expansion gap is provided.

6. A lifting piston as claimed in claim 1, wherein an annular fillet is provided at the transition between the piston skirt and its piston skirt head, on its inside wall, for reducing notch stresses.

7. A lifting piston as claimed in claim 1,
wherein an annular fillet is provided on the piston head radially inside its fire land, to be precisely in the region of the outside circumference of the end cover, for reducing notch stresses, in particular caused by thermal inequalities.

8. A lifting piston as claimed in claim 1,
wherein, to avoid a twisting of the base plate together with the end cover or its centering hub relative to the piston rod, a fixed alignment pin is arranged on one side in the piston rod, passes through the base plate and protrudes on the other side into the centering hub of the end cover.

9. A lifting piston as claimed in claim 1,
wherein the piston head is provided at the outside circumference of its fire land with a labyrinth seal, in particular in the form of turning grooves.

* * * * *